United States Patent [19]

Wang et al.

[11] Patent Number: 4,662,969

[45] Date of Patent: May 5, 1987

[54] MICROWAVE METHOD OF PERFORATING A POLYMER FILM

[75] Inventors: Chen-Shih Wang, Troy; Darrel S. Nelson, Warren, both of Mich.

[73] Assignee: General Motors Corporation, Detroit, Mich.

[21] Appl. No.: 691,470

[22] Filed: Jan. 14, 1985

[51] Int. Cl.[4] .......... B32B 31/18

[52] U.S. Cl. .......... 156/253; 156/272.4; 156/276; 264/26; 264/132; 264/154; 219/10.55 M; 219/10.55 R

[58] Field of Search .......... 156/77-79, 156/242-243, 245, 252-253, 268, 274.4, 155, 276, 272.4; 264/46.4, 46.7, 46.8, 22, 26, 154, 132; 425/290; 427/198, 243; 83/16, 21, 30; 426/113

[56] References Cited

U.S. PATENT DOCUMENTS

| | | | |
|---|---|---|---|
| 2,768,923 | 10/1956 | Kepple | 156/155 |
| 3,574,021 | 4/1971 | Van Buskirk | 156/155 |
| 3,964,951 | 6/1976 | Kremer et al. | 156/272.2 |
| 4,210,674 | 7/1980 | Mitchell | 426/113 |
| 4,347,844 | 9/1982 | Ohki | 156/77 |
| 4,419,373 | 12/1983 | Oppermann | 426/113 |
| 4,511,520 | 4/1985 | Bowen | 264/25 |

*Primary Examiner*—David Simmons

*Assistant Examiner*—Merrell C. Cashion, Jr.

*Attorney, Agent, or Firm*—Warren D. Hill

[57] ABSTRACT

A method of forming perforations in polymer film includes the steps of forming a conductive film pattern on the film preferably in a bow tie shape using a material with a moderate resistivity and applying a microwave field across the film for a few seconds whereupon sufficient electrical energy is dissipated in the conductive spot to perforate the polymer. This method is operative even when the polymer film is laminated between layers of other dielectric material prior to the microwave processing.

4 Claims, 4 Drawing Figures

MICROWAVE METHOD OF PERFORATING A POLYMER FILM

This invention relates to a method of perforating a polymer film and more particularly to such a method using microwave energy.

Traditional methods of forming perforations in polymer film materials or even paper sheets involves mechanical contact with the film such as puncturing the film with needles or punches. Perforation by electrical discharge has also been proposed. In that case, a discharge between electrodes positioned at opposite surfaces of the film can puncture the film. These prior art methods require direct access to one or both sides of the film. Where, however, the film is embedded in an assembly such that there is no direct access to the film, the prior art perforation methods are unable to perforate the film without also inflicting damage on the material covering the film to be perforated.

It has been proposed to form automotive seat cushions by first placing seat cover fabric within a mold shaped to the desired seat contour and forming the polyurethane seat cushion in place. The molding process requires an imperforate polymer film on the backing of the seat cover fabric. After the foam seat cushion is cured the polymer film must be perforated so that the foam cushion can "breathe". It is, of course, undesireable to punch needles through the seat cover fabric or through the thick foam cushion.

It is therefore a general object of the invention to provide a method of perforating a polymer film without making contact with the film, and it is a further object of the invention to provide a non-intrusive method of perforating a film which is laminated between layers of other materials.

The invention is carried out by providing on a polymer film thin spots of conductive material and then establishing a microwave field across the film to generate sufficient energy at each spot of conductive material to perforate the film. The method of the invention contemplates that the perforation take place either with exposed sheets of polymer film or with film which has been laminated between layers of other dielectric materials.

The above and other advantages of the invention will become more apparent from the following description taken in conjunction with the accompanying drawings wherein.

It has been discovered that if small spots of conductive material are placed on a polymer film and the material has electrical conductivity within a certain range then microwave energy applied across the film will cause sufficient energy to be dissipated within the conductive spot to perforate the polymer film. The same effect is achieved if the polymer film is laminated between layers of dielectric material. The perforation technique has proven effective over a wide range of polymer film thicknesses and materials as well as with various conductive materials. Where the perforation is accomplished in a laminated assembly a subsequent examination has revealed no damage whatever to the adjacent layers of material, although at each perforation a dark smudge is evident on the adjacent material surface. When the perforation is carried out on a film which is not laminated tiny flashes of light can be seen during the perforation events.

While the perforation mechanism is not known with certainty, a possible explanation is that high voltages are induced on portions of the conductive spot by the microwave field and if there is a gap or open portion in the conductive spot an electrical discharge will occur having sufficient energy to vaporize or cause combustion of the polymer film. A more likely explanation of the perforation mechanism is that the conductive spot is heated by induction; i.e., eddy currents generated by the microwave field flow through the conductive material, and wherever there is a constriction in the current flow path sufficient resistance heating occurs to perforate the polymer film by combustion or vaporization.

Figure 1:
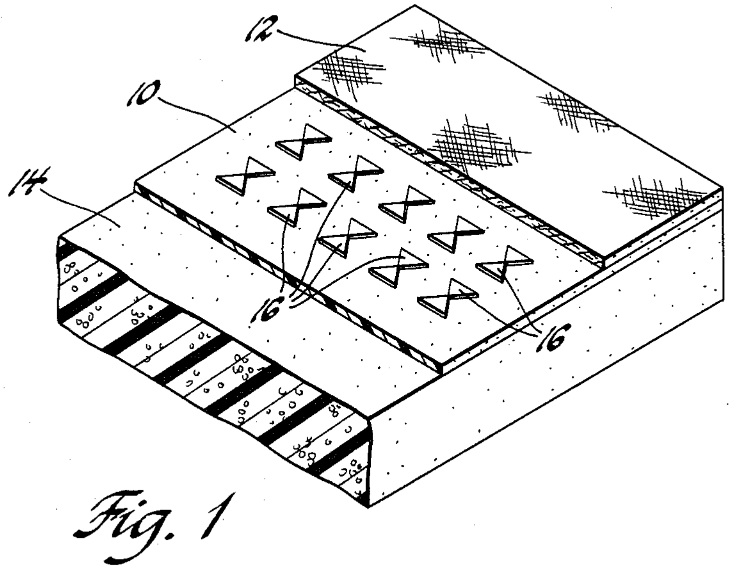
FIG. 1 is a partly broken away isometric view of a laminate assembly including a film prepared for perforation according to the preferred embodiment of the invention.

The preferred embodiment of the invention as illustrated in FIG. 1 comprises the perforation of a polymer film 10 which is laminated between a seat cover fabric 12 and a polyurethane foam support 14. The foam support may be several centimeters thick but the polymer film 10, which is preferably polyurethane is 0.05 to 0.25 mm thick. Bow tie shaped patterns 16 of conductive material are printed on a surface of the film 10. As illustrated, each bow tie pattern 16 comprises a pair of triangles arranged point to point, each triangle having a dimension of 6 to 12 mm per side. The bow tie patterns 16 are, of course, applied to the polymer film 10 prior to its assembly with the fabric and foam layers and they conveniently are applied by silk screening or other printing methods using a conductive ink. One effective ink material comprises an adhesive of neoprene and solvent filled with carbon black having a concentration 65% as measured after the solvent evaporates.

Figure 2:
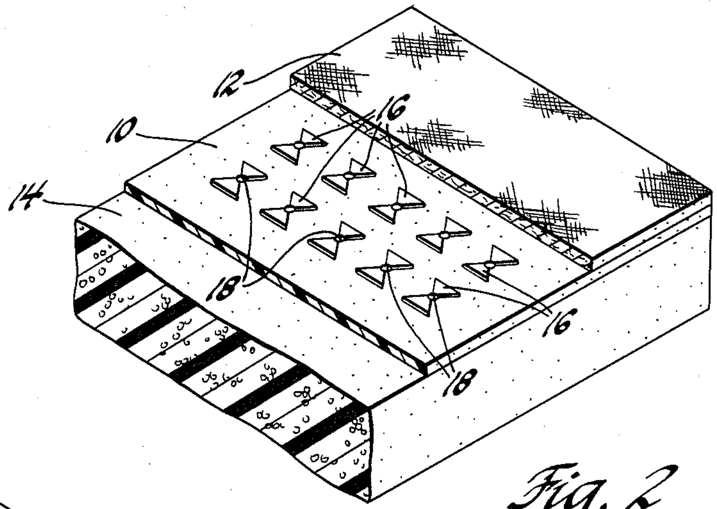
FIG. 2 is a partly broken away isometric view of the assembly of FIG. 1 after perforation according to the invention.

The laminated assembly of FIG. 1 is exposed to a microwave field to bring about perforation of the film 10. An adequate field was supplied by a 650 watt domestic kitchen microwave oven and required processing in the oven for 5 seconds or less, 2 seconds being preferred. The resulting assembly, as shown in FIG. 2, contains a perforation 18 in the polymer film 10 at the center of each bow tie pattern 16. Each perforation is roughly circular and has a diameter of about 1 mm. According to the preferred theory the bow tie pattern 16 are good antennas for coupling with the microwave field, eddy currents are induced in the conductive bow tie patterns, the energy dissipated thereby is concentrated at the narrow center of the bow tie pattern where the resistance is the greatest, and the resulting heat energy is sufficient to cause combustion and/or vaporization of the polymer film.

The material used for printing conductive bow tie patterns was found to vary in resistivity according to the type of vehicle used and the type of conductive filling. The neoprene vehicle was used with different size ranges of the carbon black particles with the following size ranges; 420 to 150 microns, 150 to 88 microns, and less than 88 microns. Other vehicles used were polyvinyl acetate and acrylic resin, each filled with carbon black. Another type of material which proved to be successful was Electrodag TM conductive inks which are commercial coating materials used for silk screening electronic components. Those inks containing a carbon filler were found to be useful. All of the above materials had resistivities in the range of 0.5 to 73 ohm-cm; other materials with very low resistivity or very high resistivity failed to produce perforation. Materials with resistivity in the range of 1 to 5 ohm-cm produce perforation when microwave processed for a time on the order of 2 seconds. Conductive film thicknesses of the bow tie pattern up to 0.25 mm were used. A variant of this process is to print the conductive bow tie spots on one polymer film and cover the spots with a second film; then both films are perforated simultaneously. With this latter arrangement it is preferred to use 0.05 mm thick polymer film for both films. An advantage of thus encapsulating the conductive bow tie patterns 16 is to ensure that the neighboring layers, say the plastic foam 14, has no deleterious effect on the bow tie pattern or the perforation operation.

Figure 3:
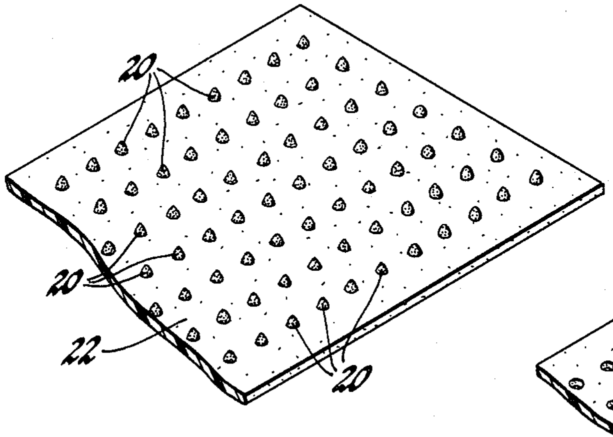
FIG. 3 is a plan view of a film prepared for perforation according to another embodiment of the invention.
Figure 4:
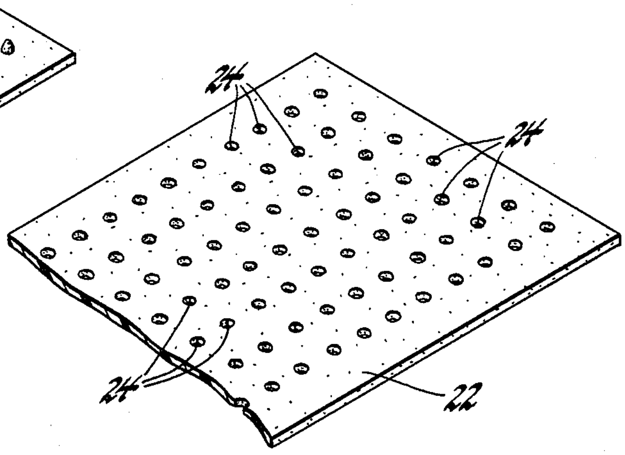
FIG. 4 is a plan view of the film of FIG. 3 after perforation according to the invention.

Another embodiment of the invention is illustrated in FIG. 3. Small piles 20 of loose carbon particles are applied to the surface of the polymer film 22. Each pile contains 10 to 15 mg of carbon and the polymer films are 0.05 to 0.30 mm thick. Films used included polyethylene, polypropylene, nylon, polyethylene terephthalate, and polyurethane. In each case, when processed in a 650 watt microwave oven holes approximately 1 mm diameter were produced. Processing times requirec were in the range of 5 to 20 seconds. FIG. 4 illustrates the resulting film having holes 24 corresponding in location to the carbon piles 20. It is thus apparent that the method according to the invention is applicable to a wide range of materials and processing variables, and while the bow tie shaped conductive spot is preferred, other geometries can be used. It is evident that the dielectric materials in the assembly, that is, the foam, fabric and polymer film must comprise materials which do not impair the effectiveness of the microwave field to perforate the polymer film.

It will thus be seen that this invention provides a method for perforating a film without mechanical contact and the film may be laminated in assembly with other materials or may be processed alone.

The embodiments of the invention for which an exclusive property or privilege is claimed are defined as follows:

1. A method of perforating a polymer film comprising the steps of:

applying to the polymer a film pattern of conductive material for each desired perforation, each pattern having a constricted portion at the desired location of a perforation, and inducing eddy currents in the conductive material by establishing a field of microwave energy across the polymer film so that the energy dissipation due to the current is concentrated at the constricted portion of each pattern and sufficient energy is released to perforate the film at each constricted portion.

2. A method of perforating a polymer film as described in claim 1 wherein the conductive film pattern has a bow tie shape.

3. A method of perforating a polymer film laminated between layers of dielectric materials comprising the steps of;

applying to the polymer film a film pattern of conductive material for each desired perforation point, each pattern having a constricted portion at the desired location of a perforation, assembling the patterned polymer film between layers of dielectric materials, and then inducing eddy currents in the conductive material by establishing a field of microwave energy across the assembly so that energy dissipation due to the current is concentrated at each constricted portion and is sufficient to perforate the film at each desired location.

4. A method of perforating a polymer film as described in claim 3 where the film pattern has a bow tie shape.

* * * * *